(12) United States Patent
Duncan et al.

(10) Patent No.: US 9,969,490 B2
(45) Date of Patent: May 15, 2018

(54) MOTOR VEHICLE WITH CAPTIVE AIRCRAFT

(71) Applicant: Elwha LLC, Bellevue, WA (US)

(72) Inventors: William D. Duncan, Mill Creek, WA (US); Roderick A. Hyde, Redmond, WA (US); Jordin T. Kare, San Jose, CA (US); Stephen L. Malaska, Redmond, WA (US); Nathan P. Myhrvold, Medina, WA (US); Robert C. Petroski, Seattle, WA (US); Thomas Allan Weaver, San Mateo, CA (US); Lowell L. Wood, Jr., Bellevue, WA (US)

(73) Assignee: Elwha LLC, Bellevue, WA (US)

(*) Notice: Subject to any disclaimer, the term of this patent is extended or adjusted under 35 U.S.C. 154(b) by 0 days. days.

(21) Appl. No.: 14/645,194

(22) Filed: Mar. 11, 2015

(65) Prior Publication Data
US 2016/0176523 A1 Jun. 23, 2016

Related U.S. Application Data

(63) Continuation of application No. 14/054,613, filed on Oct. 15, 2013.

(51) Int. Cl.
B64C 39/02 (2006.01)
B64F 1/00 (2006.01)

(52) U.S. Cl.
CPC .......... B64C 39/024 (2013.01); B64C 39/022 (2013.01); B64F 1/00 (2013.01); B64C 2201/021 (2013.01); B64C 2201/042 (2013.01); B64C 2201/046 (2013.01); B64C 2201/063 (2013.01); B64C 2201/066 (2013.01); B64C 2201/12 (2013.01); B64C 2201/127 (2013.01); B64C 2201/145 (2013.01); B64C 2201/146 (2013.01); B64C 2201/208 (2013.01)

(58) Field of Classification Search
CPC ..... H04N 7/184; G01C 11/02; G08B 13/1965
See application file for complete search history.

(56) References Cited

U.S. PATENT DOCUMENTS 3,980,259 A 9/1976 Greenhalgh et al.
5,695,153 A 12/1997 Britton et al.
7,152,347 B2 12/2006 Herzog et al.
(Continued)

FOREIGN PATENT DOCUMENTS

CN 2010-40587 3/2008
CN 201040587 Y 3/2008
DE 102011106170 A1 2/2012

OTHER PUBLICATIONS

PCT International Search Report; International App. No. PCT/US2014/060681; dated Jan. 26, 2015; pp. 1-3.
(Continued)

Primary Examiner — Michael D Lang
(74) Attorney, Agent, or Firm — Foley & Lardner LLP

(57) ABSTRACT

A motor vehicle system includes a motor vehicle including an aircraft landing portion, and an actively propelled unmanned aircraft configured to be supported on the aircraft landing portion. The vehicle and aircraft are configured such that the vehicle can provide at least one of fuel and electrical energy to the aircraft while the aircraft is supported on the aircraft landing portion.

33 Claims, 9 Drawing Sheets

(56) References Cited

U.S. PATENT DOCUMENTS

| | | |
|---|---|---|
| 7,946,530 B1 | 5/2011 | Talmage, Jr. |
| 8,073,294 B2 | 12/2011 | Huffman et al. |
| 8,193,496 B2 | 6/2012 | Furry |
| 8,276,844 B2 | 10/2012 | Kariv |
| 8,426,813 B2 | 4/2013 | Furry |
| 8,433,462 B2 | 4/2013 | Miller et al. |
| 2004/0167682 A1 | 8/2004 | Beck et al. |
| 2005/0195096 A1 | 9/2005 | Ward |
| 2005/0278982 A1 | 12/2005 | Herzog et al. |
| 2006/0091310 A1 | 5/2006 | Furry |
| 2007/0076918 A1 | 4/2007 | Dai et al. |
| 2009/0040307 A1 | 2/2009 | Rubin |
| 2009/0224097 A1 | 9/2009 | Kariv |
| 2010/0017046 A1* | 1/2010 | Cheung ............ G01S 7/003 701/2 |
| 2010/0025543 A1 | 2/2010 | Kinsey et al. |
| 2010/0166357 A1 | 7/2010 | Huffman et al. |
| 2011/0006164 A1 | 1/2011 | Märtensson et al. |
| 2011/0199254 A1 | 8/2011 | Bishop et al. |
| 2012/0029732 A1 | 2/2012 | Meyer |
| 2012/0080556 A1 | 4/2012 | Root, Jr. |
| 2012/0273680 A1 | 11/2012 | Furry |
| 2013/0220162 A1 | 8/2013 | Miller et al. |
| 2014/0257595 A1 | 9/2014 | Tillmann |

OTHER PUBLICATIONS

European Patent Office, Supplementary European Search Report, Pursuant to Rule 62 EPD; App. No. EP 14 85 4105; dated Jun. 27, 2017; 1-7.

* cited by examiner

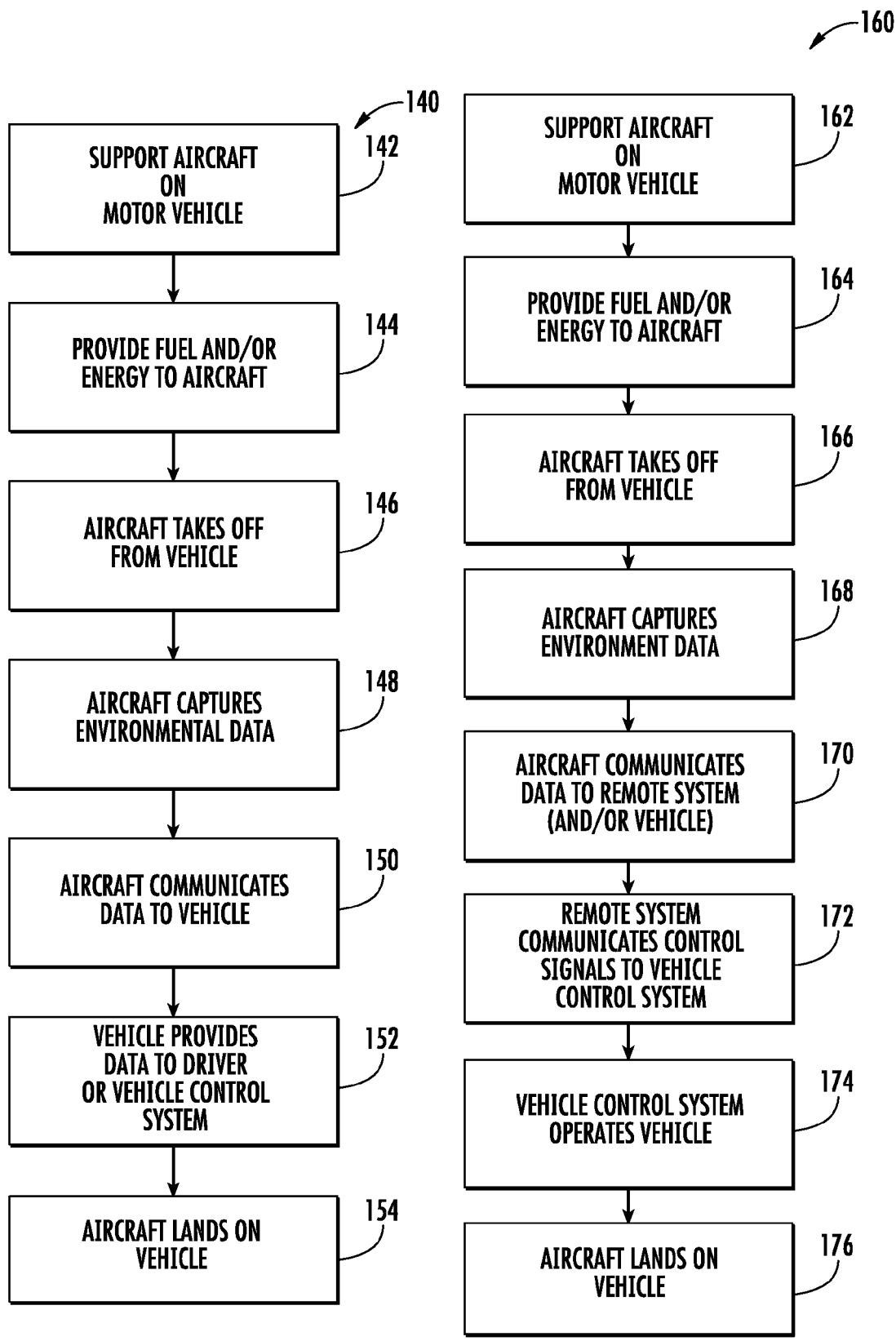

US 9,969,490 B2

MOTOR VEHICLE WITH CAPTIVE AIRCRAFT

CROSS-REFERENCE TO RELATED PATENT APPLICATIONS

This application is a continuation of U.S. patent application Ser. No. 14/054,613, filed Oct. 15, 2013, which is incorporated herein by reference in its entirety.

BACKGROUND

Motor vehicles such as cars, trucks, buses, etc. encounter different types of driving conditions while travelling along roads, etc. Various driving conditions may impact the speed of the vehicle (e.g., in the case of heavy traffic), the safety of driving the vehicle (e.g., in the case of icy road conditions, etc.), or the ability of the vehicle to travel on certain routes.

SUMMARY

One embodiment relates to a motor vehicle system comprising a motor vehicle including an aircraft landing portion; and an actively propelled unmanned aircraft configured to be supported on the aircraft landing portion; wherein the vehicle and aircraft are configured such that the vehicle can provide at least one of fuel and electrical energy to the aircraft while the aircraft is supported on the aircraft landing portion.

Another embodiment relates to an unmanned aircraft for use with a motor vehicle, comprising a propulsion system configured to enable the aircraft to take off and land from a motor vehicle; a transceiver configured to provide communication between the aircraft and the motor vehicle; and a coupling port configured to be removably coupled to the motor vehicle and receive at least one of fuel and electrical energy from the motor vehicle.

Another embodiment relates to a motor vehicle comprising a vehicle body including an aircraft landing area configured to support an aircraft; and a vehicle coupling port configured to provide at least one of fuel and electrical energy to the aircraft when the aircraft is located on the landing area and coupled to the vehicle coupling port.

Another embodiment relates to a motor vehicle system comprising a motor vehicle including an aircraft support portion; an actively propelled unmanned aircraft configured to be selectively supported on the aircraft support portion; and a computer vehicle control system configured to control operation of the motor vehicle based at least in part based on data acquired by the aircraft.

Another embodiment relates to a method of operating a motor vehicle system comprising providing an actively propelled unmanned aircraft on an aircraft landing area of a motor vehicle; launching the aircraft from the motor vehicle such that the aircraft becomes airborne; acquiring environment data regarding a driving environment of the motor vehicle using the aircraft; and communicating aircraft output data from the aircraft to the vehicle, the aircraft output data being based at least in part on the environment data.

Another embodiment relates to a method of operating a motor vehicle system comprising acquiring environment data regarding a driving environment for a vehicle using an actively propelled unmanned aircraft; communicating aircraft output data from the aircraft to a remote system; and receiving driving control signals from the remote system at the vehicle such that the vehicle is controlled in response to the driving control signals.

Another embodiment relates to a method of communicating using a captive aircraft comprising launching an actively propelled unmanned aircraft from a motor vehicle; establishing a first communication link between the aircraft and the motor vehicle using a first communication protocol; establishing a second communication link between the aircraft and a wireless access point; and communicating data from the motor vehicle to the aircraft using a first communication protocol; and forwarding the data received from the motor vehicle to the wireless access point using the second communication protocol.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 11 is a block diagram of a method of operating a vehicle system according to one embodiment.

FIG. 12 is a block diagram of a method of operating a vehicle system according to another embodiment.

DETAILED DESCRIPTION

Figure 1:
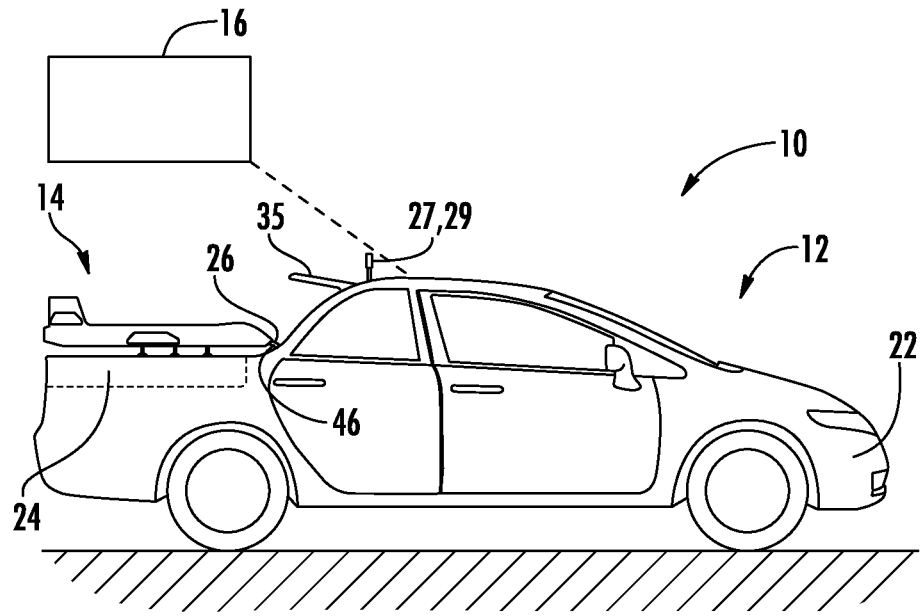
FIG. 1 is a schematic representation of a vehicle system according to one embodiment.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to the figures generally, various embodiments disclosed herein relate to a motor vehicle system that utilizes a captive aircraft (e.g., an unmanned vehicle, drone, etc.) to capture information regarding a particular environment (e.g., a driving environment for a motor vehicle, etc.). Based on the captured information, the captive aircraft can provide various types of data to the motor vehicle system or other remote systems, etc. that is usable in connection with operation of the vehicle.

In some embodiments, the captive aircraft can capture audio, visual, or other data or information regarding all or a portion of a driving environment (e.g., to capture traffic information, accident information, road condition information, etc.) and provide various data to, for example, a motor vehicle, remote vehicle control system, or another system. The motor vehicle can in turn provide various inputs to a driver (e.g., via one or more output devices such as displays, etc. that may be provided within the interior of the vehicle), an on-board vehicle system (e.g., an on-board robotic driving system, a vehicle control system, an on-board vehicle navigation system, etc.), and/or other remote systems (e.g., a remote vehicle control system, etc.) based on receiving the data from the aircraft.

As discussed in further detail below, the aircraft can be a "captive" vehicle, such that the aircraft can "roost" on a support platform, landing area, etc. of the motor vehicle while the aircraft is grounded (e.g., on the vehicle) and the vehicle is stationary or in motion. Furthermore, the aircraft can be selectively deployed, or launched, from the vehicle to travel various routes, and may be able to take off and land on the vehicle both when the vehicle is stationary and when the vehicle is in motion.

Figure 2:
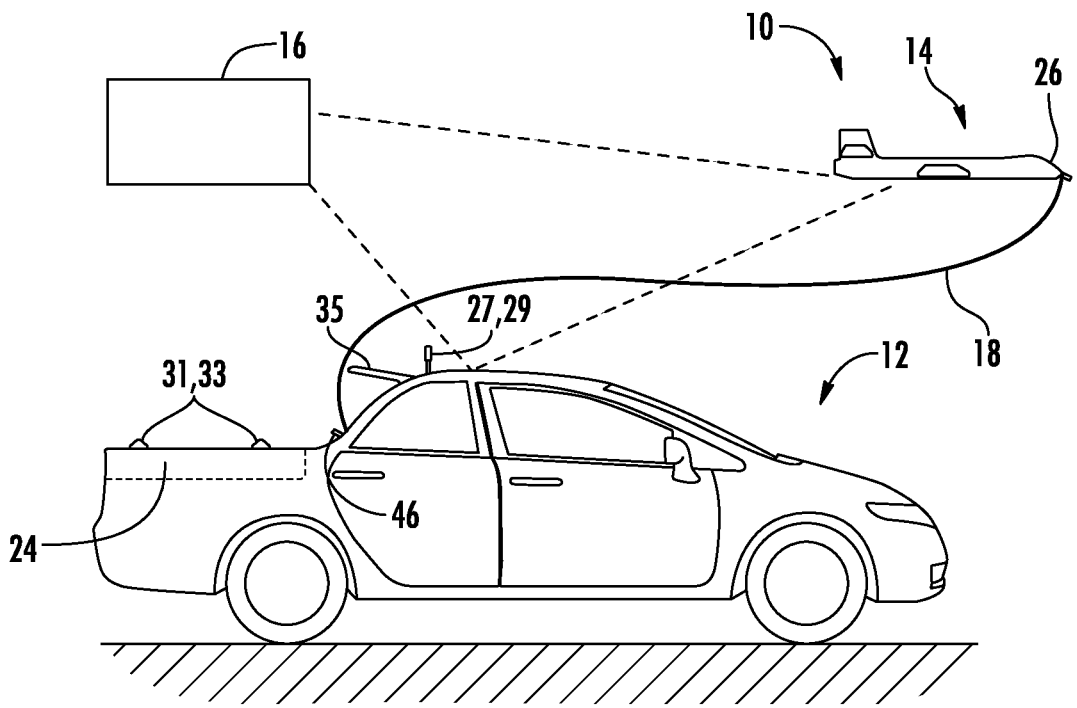
FIG. 2 is another schematic representation of the vehicle system of FIG. 1 according to one embodiment.

Referring now to FIGS. 1-2, a motor vehicle system is shown as vehicle system 10 according to one embodiment. Vehicle system 10 includes a motor vehicle 12, an aircraft 14, and optionally, a remote system 16. As discussed in greater detail below, motor vehicle 12, aircraft 14, and remote system 16 can communicate wirelessly with each other to exchange various type of data and information. As shown in FIG. 2, in some embodiments motor vehicle 12 and aircraft 14 can be configured for one or both of wireless communications and wired communications (e.g., via a wired link 18 such as a fiber optic cable, a communications cable, etc.). In general, aircraft 14 is configured to receive or capture information regarding an environment, such as a driving environment for vehicle 12, and provide various outputs to one or both of vehicle 12 and remote system 16 based on the captured information.

Figure 3:
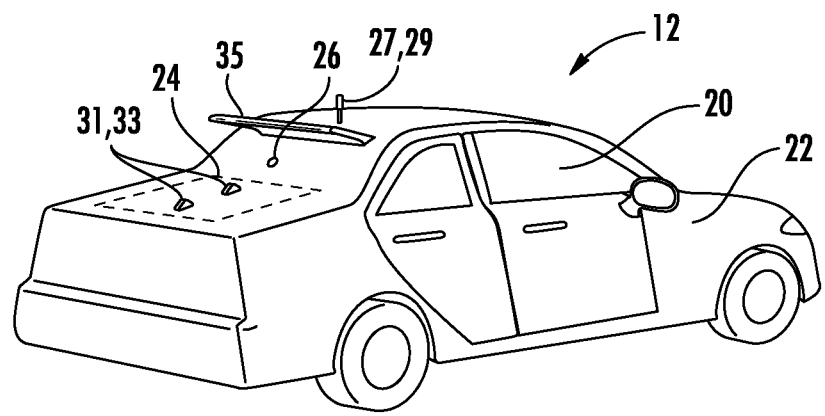
FIG. 3 is a perspective view of a motor vehicle usable with the vehicle system of FIG. 1 according to one embodiment.
Figure 4:
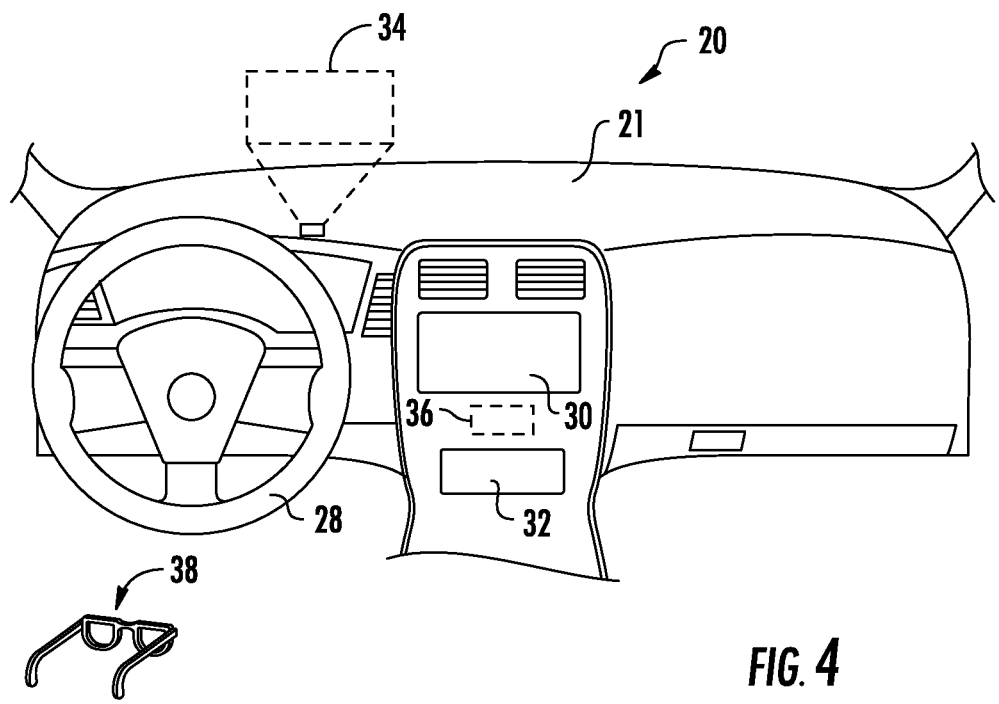
FIG. 4 is a partial view of an interior of the motor vehicle of FIG. 3 according to one embodiment.

Referring to FIGS. 3-4, according to one embodiment, motor vehicle 12 includes an interior 20, an exterior 22, an aircraft landing area 24, and a vehicle coupling port 26. Exterior 22 generally provides the exterior body of the vehicle, and may take any suitable size or shape. As shown in FIG. 3, vehicle 12 can take the form of a car (e.g., a two-door car, a four door car, a minivan, a sport utility vehicle, etc.), while according to various alternative embodiments, vehicle 12 can be a van, bus, truck, train, or any other suitable type of motor vehicle. Furthermore, as discussed in greater detail below, vehicle 12 can be configured for manual driving (e.g., via a driver seated within interior 20), remote driving (e.g., via remote system 16, etc.), and/or robotic driving (e.g., via a robotic or vehicle control system on board or remote from vehicle 12).

Aircraft landing area 24 provides a secure take-off and landing area for aircraft 14. As discussed in greater detail below, aircraft 14 can be positioned on landing area 24 both when vehicle 12 is stationary and when vehicle 12 is moving. Landing area 24 can be provided at any suitable location on vehicle 12, including a rear (trunk) area,) a roof/top area, etc., and can include any suitable mechanisms for holding aircraft 14 in place, such as mechanical couplings (e.g., vehicle coupling port 26), magnetic couplings (e.g., a magnetizable portion of landing area 24, etc.), or any other suitable mechanism (e.g., straps, hooks, mechanical couplings, etc.). Aircraft landing area 24 may include landing arrest systems 31 (e.g., nets, cables, etc.) configured to aid in landing aircraft 14 on vehicle 12. Aircraft landing area 24 may further include launch assist systems 33 (e.g., catapults, motors, etc.) configured to aid aircraft 14 in taking off from vehicle 12. Vehicle 12 may include wind shield 35 configured to shelter aircraft 14 from local airflow during landing on vehicle 12 or takeoff from vehicle 12. Wind shield 35 can be provided on or adjacent aircraft landing area 24 or another suitable location on vehicle 12.

Landing of aircraft 14 on vehicle 12 can be a challenging operation, particularly when vehicle 12 is in motion. Accordingly, vehicle 12 can provide assistance and/or control for aircraft 14 during landing operations. Vehicle 12 can provide information to aircraft 14 on the local airflow near vehicle 12 or aircraft landing area 24. In one embodiment, vehicle 12 provides wind vane or windsock 27 which can be visually detected by aircraft 14. In another embodiment, vehicle 12 includes wind sensor 29 which can quantitatively determine the speed and/or direction of the local airflow, and communicate this information to aircraft 14. Vehicle 12 can be configured to actively control flight of aircraft 14 during its landing. In some embodiments, vehicle 12 can instruct aircraft 14 to abort a landing operation based on extreme (i.e., ones above a specified threshold) driving maneuvers; such abort instructions can be issued during said maneuvers or beforehand (i.e., once the need for the maneuver is apparent). In some embodiments, aircraft 14 can control its own landing operations; vehicle 12 may assist this by providing aircraft 14 with information regarding its planned or actual driving maneuvers. During landing operations, aircraft 14 may abort the landing if it observes (or is told of) vehicle 12 undergoing extreme driving maneuvers, given excessive nearby traffic, etc.

In one embodiment, landing area 24 is a generally flat portion defined by exterior 22 of vehicle 12, such that landing area 24 provides a stable surface from which aircraft 14 can take off and onto which aircraft 14 can land. Landing area 24 may be integrally formed with the remainder of vehicle exterior 22, or alternatively, may be provided as a separate component so as to be repositionable to various areas of the vehicle and/or removable when not in use. In further embodiments, landing area 24 can include one or more contoured surfaces configured to engage corresponding portions of aircraft 14. For example, recesses, or indentations, may be provided in the surface of landing area 24 to receive wheels or other features of aircraft 14.

Referring to FIG. 4, interior 20 of vehicle 12 is shown in greater detail and includes various components (e.g., input/output devices) that are operable to provide various types of data and information to a driver of vehicle 12 and/or to receive inputs from a driver of vehicle 12. For example, vehicle 12 includes a steering wheel 28 or similar control device for controlling the direction of travel of vehicle 12. A dash assembly 21 may include a display device 30, an audio output device 32, a head up display 34, and other input/output devices 36 (e.g., alarms, etc.). Furthermore, glasses 38 may include an integrated display feature for displaying text, images, or other information to a driver while a driver wears glasses 38. As discussed in greater detail below, the various above-mentioned components are configured to provide information to a driver of vehicle 12 based at least in part on the data received from aircraft 14 and/or data received from remote system 16.

Display 30 may be an on board display usable, for example, with a GPS and/or vehicle navigation system such that display 30 can display various types of information to a user, including various maps, satellite views, etc., that can include a current location, a destination location, a primary driving route and/or a secondary driving route, etc. As discussed in greater detail below, display 30 can display various images, videos, etc. based on data captured by aircraft 14. Display 30 may be any suitable display type (e.g., LED, LCD, etc.), and include touch-sensitive features (e.g., a touch screen, etc.), buttons, and the like.

Audio output device 32 can be a speaker or other suitable audio output device configured to provide audible outputs to a driver and/or passenger situated within interior 20 of vehicle 12, and can provide various types of audible information, such as warning signals and/or alarms, audible driving directions based, for example, on a driving route displayed via display 30, etc. As discussed in greater detail below, audio output device 32 can provide various audible messages, signals, alarms, etc. based on data captured by aircraft 14. Any suitable device may be used according to various alternative embodiments, and in some embodiments, display 30 and audio output device 32 may be provided in the form of an integrated audio/visual device.

In some embodiments, in addition to display 30 and/or audio output device 32, a head up display 34 can be provided within interior 20 and be configured to provide various types of data to a driver of vehicle 12 such that various data, etc. is display generally near the line of sight of the driver (e.g., near or adjacent the line of sight normally used by a driver while driving the vehicle). This can reduce the need of the driver to, for example, turn his or her head to view a dash-mounted display such as display 30. In some embodiments, displays 30, 34 are user configurable such that a driver, passenger, or other user can select which (or both) display(s) to use at certain times, what types of data to display on each display, etc.

According to further embodiments, other input/output devices such as device 36 can be used to receive inputs from and/or provide outputs to a driver, passenger, or other user of vehicle 12. For example, device 36 may be or include additional audio and/or visual input/output devices such as a display, speaker, microphone, etc.

While devices 30, 32, 36 are generally shown located at a mid-portion of dash assembly 21, according to various other embodiments, the size and/or location of devices 30, 32, 36 can be varied. Furthermore, while in some embodiments devices 30, 32, 36 can be integrally assembled into dash assembly 21 or another component of vehicle 12 (e.g., an overhead component, a visor, rear view mirror, etc.), in other embodiments, devices 30, 32, 36 (and similarly, devices 34, 38) can be removable and/or replaceable components such that they can be removed from interior 20 by a driver, passenger, etc.

Figure 5:
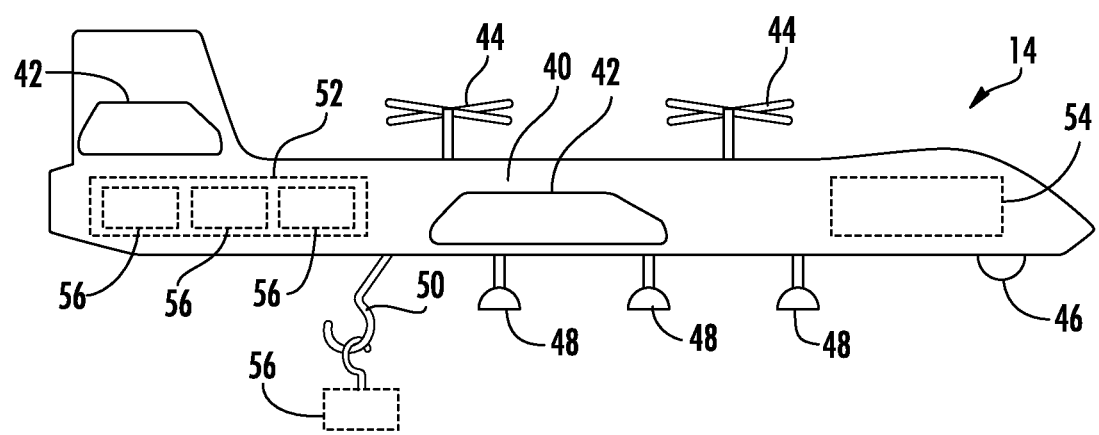
FIG. 5 is a side schematic view of an aircraft usable with the vehicle system of FIG. 1 according to one embodiment.

Referring now to FIG. 5, aircraft 14 is shown in greater detail according to one embodiment. Aircraft 14 is an unmanned aircraft that may be "captively" operated from or near vehicle 12. For example, aircraft 14 can remain grounded on vehicle 12 both while vehicle 12 is stationary, and while vehicle 12 is moving. Further, aircraft 14 can take off and land from landing area 24 both while vehicle 12 is stationary, and while vehicle 12 is moving. Further yet, while aircraft 14 is positioned on landing area 24, aircraft 14 can receive electrical energy and/or fuel from vehicle 12 to power the aircraft. In yet further embodiments, aircraft 14 can be "tethered" to vehicle 12 during flight via line 18 (e.g., a fiber optic cable, a power cable, etc.), such that aircraft 14 can receive electrical energy, control signals, fuel, etc. from vehicle 12 via line 18 during flight. Aircraft 14 may be robotically controlled (e.g., by a control system on-board aircraft 14, vehicle 12, or at an external location). Aircraft 14 may be remotely piloted by a human operator (e.g., on vehicle 12 or at an external location).

Aircraft 14 includes body 40, one or more wings 42, and/or one or more rotors 44. Aircraft 14 includes an active propulsion system comprising one or more propellers, rotors, rockets, or jets powered by combustion and/or electricity. In some embodiments, aircraft 14 can be a fixed wing aircraft (e.g., in the shape of a conventional airplane, etc.) and operate without rotors. In other embodiments, aircraft 14 can be a rotor-driven aircraft (e.g., in the form of a conventional helicopter, quadricopter, etc.), that is powered by one or more rotors and does not include a conventional fixed wing configuration. In further embodiments, aircraft 14 can include both one or more wings and one or more rotors. A rotor driven aircraft can be advantageous for landings and takeoffs when using a small or spatially restricted landing area 24 on vehicle 12. In some embodiments, the rotors may be tiltable, providing optimal lift during landing and takeoff, as well as forward propulsion during flight. Body 40 (e.g., a housing, frame, etc.) defines and/or can provide support for various components of aircraft 14, including aircraft coupling port 46, one or more sensors 48, a cargo holder 50, a cargo area 52, and/or an aircraft input/output device 54.

Referring further to FIG. 5, aircraft coupling port 46 is in one embodiment configured to provide selective coupling between aircraft 14 and vehicle 12. For example, when aircraft 14 is landed on vehicle 12, port 46 can couple with vehicle coupling port 26. The interface between ports 26, 46 can provide a variety of features, including providing a mechanical fastening mechanism for holding aircraft 14 onto landing area 24, enabling wired communications between aircraft 14 and vehicle 12, enabling the transfer of electrical energy, fuel (e.g., gas, liquid, etc.), oxidizer, etc. between vehicle 12 and aircraft 14, etc. Fuel may comprise hydrocarbons, hydrogen, lithium or other combustible materials. In some embodiments, the fuel may be combusted (with air or an oxidizer) on-board aircraft 14 to power a propulsion system, or for electrical energy generation in a generator, a fuel cell, or the like. Electrical energy (whether transferred from vehicle 12, or generated on-board aircraft 14) may be used on aircraft 14 to power a propulsion system, may be stored in a battery, may be used to power aircraft systems (e.g., communications, sensors, etc.). As such, ports 26, 46 may include various mechanical, electrical, fluid, and other coupling and interface features.

While in some embodiments ports 26, 46 may be coupled directly together, in other embodiments, additional conduits (e.g., lines, cables, tubes, etc.) such as line 18 shown in FIG. 2 may be provided between port 26 and 46. For example, during flight of aircraft 14, it may be advantageous to maintain a physical coupling between aircraft 14 and vehicle 12. In such a case, aircraft 14 may be physically coupled to vehicle 12 during flight of aircraft 14 via aircraft coupling port 46, line 18, and vehicle coupling port 26. Further yet, while is some embodiments coupling ports 26, 46 and line 18 can provide a single integrated interface between aircraft 14 and vehicle 12, in other embodiments, separate ports, lines, etc. can be provided based on a desired interface feature. For example, separate interfaces (e.g., ports, conduits, etc.) may provide a wired communications link, an electrical energy transfer link, a fuel link, etc. Other variations regarding ports 26, 46 are possible according to various alternative embodiments.

Sensors 48 are configured to capture or acquire data and information regarding an environment over, through, or near which aircraft 14 is travelling. In one embodiment, sensors 48 can include one or more still image cameras and/or video cameras configured to capture images and/or video of a driving environment. For example, still image cameras or video cameras can provide a view (e.g., a video and/or still image(s)) of a driving route over a hill, around a curve or bend (e.g., a blind intersection), etc., provide a view of upcoming traffic conditions, an accident or other road blockage, material obstructing a railway track, etc. In further embodiments, sensors 48 can be or include one or more radar devices, lidar devices, or similar devices configured to provide data regarding a driving environment, including data usable to generate computer-generated renditions of local terrain, traffic, etc. For example, an imaging radar system may be used to generate images of a desired area. A lidar imaging system (e.g., using a laser system) can similarly be used to generate images. In yet further embodiments, sensors 48 can include various other data capture devices, including night vision image capture devices, etc., audio sensors such as microphones, etc. and a variety of other sensors. Spectroscopic or multi-color imaging sensors can be used to image in the ultraviolet, the infrared, or other specific frequency bands. In one embodiment, sensors 48 can be used to provide surveillance of vehicle 12 (e.g., truck or train) when vehicle 12 is parked (e.g., at night) to detect or deter instances of theft or vandalism. Aircraft 14 captures driving environment data via the various sensors and, based at least in part on the captured data, provides aircraft output data to vehicle 12 and/or remote system 16.

In some embodiments, aircraft 14 is configured to carry one or more cargo items such as cargo items 56 shown in FIG. 5. For example, a cargo holder 50 (e.g., a hook, magnet, clamp, strap, etc.) may be provided on aircraft 14 to enable aircraft 14 to pick up and/or drop off various items of cargo (e.g., packages, boxes, mail, advertising materials, etc.). A cargo area 52 may be included in the interior of aircraft 14 and be configured to carry additional packages, etc. In one embodiment, cargo area 52 is configured to hold one or more first aid and/or rescue kits, such that aircraft 14 can provide first aid kits, etc. to persons in the area of a car accident, etc. As discussed in greater detail below, providing aircraft 14 with cargo-carrying capabilities enables a driver to use aircraft 14 to make deliveries/pickups, etc. In some embodiments, such deliveries or pickups can be made without having to stop vehicle 12.

Aircraft 14 further includes input/output device 54. Device 54 may be a touchscreen display that can act as an input/output device, and can include one or more buttons, speakers, microphones, etc. to facilitate receiving/providing inputs and outputs. Device 54 can be configured to, for example, receive flight instructions from a user, receive inputs from remote persons (e.g., during delivery of a package to receive an electronic signature, a voice message, etc.), etc. Device 54 can be configured to, for example, advise an entity (e.g., a car, person, animal, etc.) of the approach of vehicle 12. For example, when aircraft 14 is used with a train as vehicle 12, device 54 can be used to induce animals to move off railway tracks ahead of the train. Device 54 can be provided at any suitable location on aircraft 14 and be of any suitable size or shape.

Figure 6:
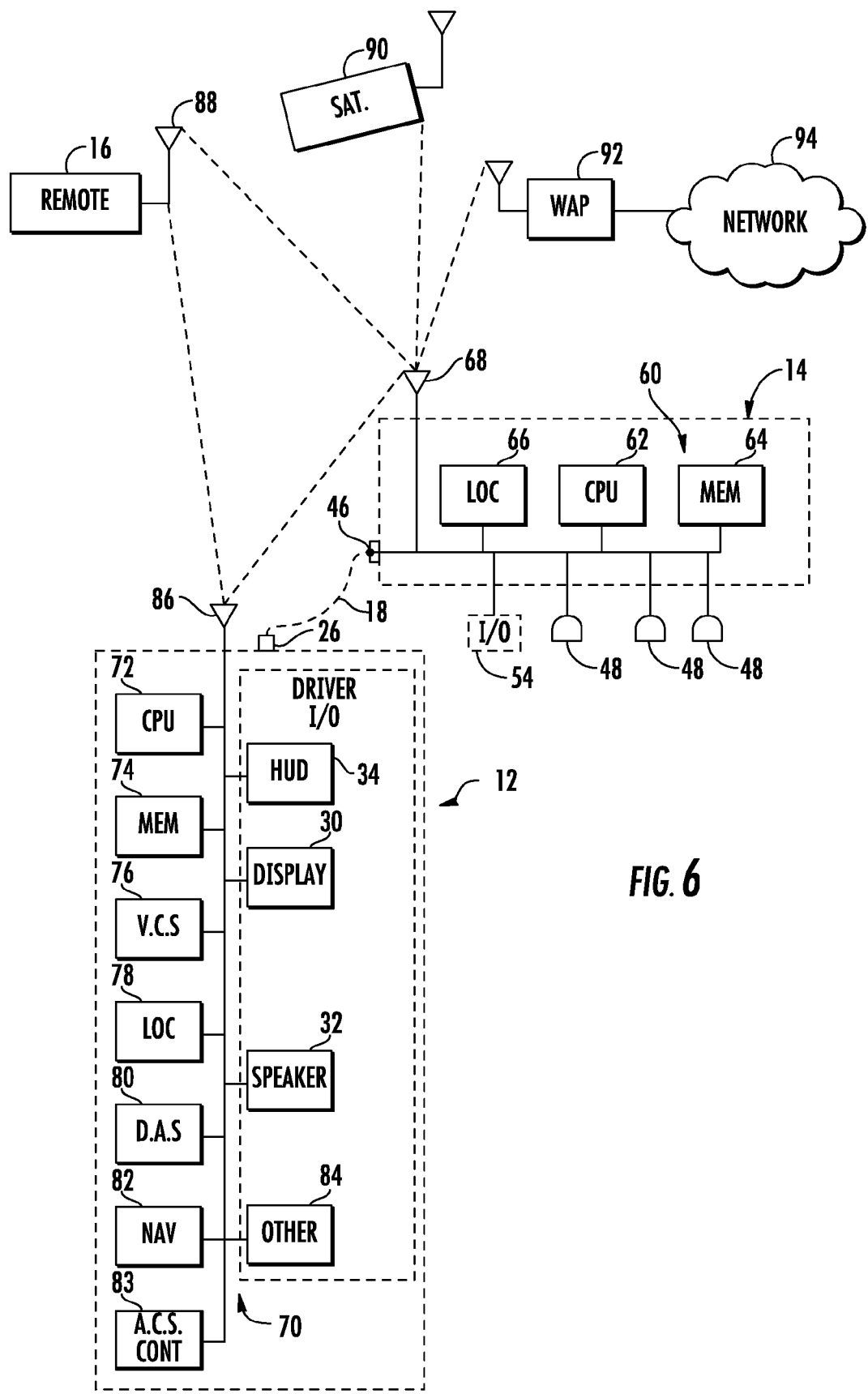
FIG. 6 is a schematic block diagram of the vehicle system of FIG. 1 according to one embodiment.

Referring now to FIG. 6, a schematic illustration of various components of, and communications between, vehicle 12, aircraft 14, and remote system 16 is shown according to one embodiment. As shown in FIG. 6, vehicle 12, aircraft 14, and remote system 16 are configured to communicate with each other via wired and/or wireless communications. As discussed in greater detail below, in some embodiments, aircraft 14 can further be configured to communicate with one or more satellites 90, wireless access points 92 (e.g., to provide access to a network 94 such as the Internet, etc.), or other remote devices (including remote system 16), to enable vehicle 12 to communicate wirelessly with other remote devices when vehicle 12 would be otherwise unable to communicate wirelessly with such devices (e.g., because of signal blockages, signal range limitations, etc.). As such, aircraft 14 can provide "repeater" functionality to vehicle system 10 to receive signals from vehicle 12 and retransmit the signals to other remote devices.

Vehicle 12 includes processing circuit 70 having processor 72, memory 74, vehicle control system 76, location determining system 78, damage assessment system 80, navigation system 82, and aircraft control system 83. Circuit 70 may further include various other input and output devices such as display 30, speaker 32, head up display 34, and/or other components 84 (e.g., glasses 38 shown in FIG. 4). The various components of circuit 70 are configured to receive and process various inputs received from aircraft 14, remote system 16, a driver, and/or other sources (e.g., other motor vehicle systems, other remote systems, etc.). Processor 72 and memory 74 can include any suitable processing and memory devices, and multiple processing and/or memory devices may be used according to various alternative embodiments.

Vehicle control system 76 is configured to control various features of vehicle 12. For example, vehicle control system 76 can in some embodiments control one or more of vehicle steering, acceleration, braking, etc. based on a variety of inputs received from a driver, from aircraft 14, from remote system 16, or from other sources (e.g., other vehicles and/or other remote devices, etc.). As discussed in greater detail below, vehicle control system 76 may be or include a robotic driving system configured to autonomously or semi-autonomously operate vehicle 12. In some embodiments, the vehicle control system can include a collision avoidance system configured to provide various warnings and/or control operation of the vehicle to avoid an expected collision, etc.

Location determining system 78 is configured to determine a current location of vehicle 12 and/or aircraft 14. Location determining system 78 may use any of a variety of means to determine the location of vehicle 12 and/or aircraft 14, including a global positioning system (GPS), using the location of nearby wireless access points, etc. Location determining system 78 may communicate location information from vehicle 12 or aircraft 14 to the other; this information may include position, speed, velocity, orientation, angular velocity, acceleration, etc. Location determining system 78 may include positioning aids on either (or both) of vehicle 12 or aircraft 14 to aid the other in determining their relative position, velocity, or orientation. Such positioning aids can include reflectors, retroreflectors, transmitters, beacons, or transponders operating at radiofrequency or optical wavelengths. For example, aircraft 14 can direct a radiofrequency beam or laser beam at vehicle 12, receiving a retroreflected return from a cornercube on vehicle 12 (e.g., provided as part of the vehicle body). The return signal can be analyzed to provide range, direction, or Doppler-derived velocity information. In some embodiments, location determining system 78 may use a global positioning system on aircraft 14, in combination with relative position information of vehicle 12 with respect to aircraft 14 (e.g., obtained via the aforementioned positioning aids) in order to provide vehicle 12 with information regarding its position. This may be useful, for example, in urban environments where vehicle 12 is not able to obtain a high quality GPS signal, but where aircraft 14 (by virtue of its altitude or location) can.

Damage assessment system 80 is configured to receive and/or store various data regarding damage done to vehicle 12 as a result of, for example, an accident, etc., such that damage information can be communicated to aircraft 14, remote system 16, or other remote devices. In some embodiments, vehicle 12 can instruct aircraft 14 to takeoff in advance of a potential collision so as to be available to provide post-collision data to emergency personnel. Navigation system 82 is configured to provide various data to a driver and/or other on-board and/or remote systems regarding, for example, a map (e.g., computer representation, satellite view, etc.) of a driving environment, a current location of vehicle 12 and/or aircraft 14, a travel route for vehicle 12 and/or aircraft 14, traffic and/or road conditions within a driving environment and/or along a travel route, etc. Navigation system 82 can provide both visual (e.g., via display 30) and audible (e.g., via audio output device 32) outputs to a driver to communicate traffic conditions, road conditions, alternate route options, etc.

Aircraft control system 83 is configured to determine a travel route for aircraft 14 such that the travel route and/or control signals can be communicated to aircraft 14. The travel route of aircraft 14 can be based on a variety of factors. In one embodiment, aircraft 14 is configured to travel a set distance (which may be configurable by a driver) ahead of vehicle 12. The distance may be in a current direction of travel of vehicle 12, or alternatively, may be along a travel route of vehicle 12 (which may not necessarily be in the current direction of the vehicle) determined by, for example, navigation system 82. In further embodiments, aircraft 14 can be configured to travel a route customized by a driver and/or other user. In yet further embodiments, aircraft 14 can be configured to travel directly to/from desired destinations (using, for example, the shortest possible flight pattern, which may vary from a driving route). According to various other alternative embodiments, aircraft control system 83 can provide a wide variety of travel routes for aircraft 14.

In some embodiments, vehicle 12 is a manually driven vehicle, such that circuit 70 is configured to receive driving environment data from aircraft 14 via transceiver 86 and provide various outputs to a driver and/or other components of vehicle 12. For example, processor 72 may direct video images received from aircraft 14 to display 30 such that a driver can see, for example, traffic conditions that exist on a planned driving route and that the driver may encounter if the driver remains on the present route. Similarly, processor 72 may direct traffic data to navigation system 82 such that navigation system 82 can take otherwise unknown traffic information into account when planning a driving route, suggesting alternative driving routes, estimating drive times, etc. As discussed in greater detail below, processing circuit 70 can process a wide variety of other types of data.

In alternative embodiments, vehicle 12 is a remotely operated vehicle, such that circuit 70 is configured to receive data (e.g., remote system data) from remote system 16 and provide various inputs to other components of vehicle 12 (e.g., vehicle control system 76) based on the data. Remote system 16 in turn receives driving environment data from aircraft 14 via transceiver 88 or similar device. For example, aircraft 14 may capture data via sensors 48 indicating that a road is blocked on a primary driving route for vehicle 12. Aircraft 14 can provide this data to remote system 16, which can in turn direct vehicle control system to direct vehicle 12 to travel along a secondary driving route that avoids the blockage.

In further embodiments, vehicle 12 can be a robotically controlled vehicle, such that circuit 70 is configured to receive driving environment data from aircraft 14 via transceiver 86 and provide various inputs to vehicle control system 76 based at least in part on the driving environment data. Similar to when vehicle 12 is remotely operated, aircraft 14 may capture data via sensors 48 indicating that a road is blocked on a primary driving route for vehicle 12. Rather than providing this data to remote system 16, aircraft 14 can provide this data to vehicle 12 (e.g., circuit 70), which can include a robotic driving system (e.g., incorporated into the vehicle control system) and can direct the vehicle to travel along a secondary driving route that avoids the blockage.

Referring further to FIG. 6, in one embodiment, aircraft 14 includes a processing circuit 60 having a processor 62, a memory 64, a location determining system 66, and a transceiver 68. Sensors 48 and input/output device 54 also form part of circuit 70. Processor 62 is configured to receive inputs (e.g., data such as driving environment data, etc.) from sensors 48, and based at least in part on the inputs, transmit data (e.g., aircraft output data) to vehicle 12 and/or remote system 16. Processor 62 may further be configured to store data in memory 64, including data received from sensors 48, input/output device 54, remote system 16, or another source of data.

Figure 7:
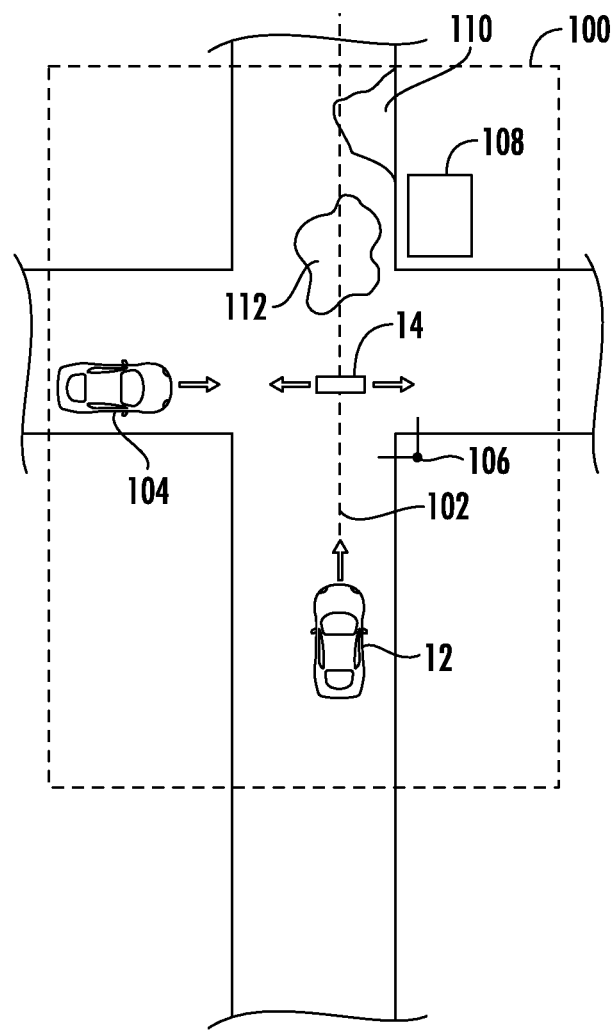
FIG. 7 is a top view of a vehicle system within a driving environment according to one embodiment.

Referring now to FIG. 7, vehicle 12 operating within a driving environment 100 is shown according to one embodiment. As shown in FIG. 7, vehicle 12 is travelling along driving route 102. Driving route 102 may be a route determined by vehicle navigation system 82, or alternatively, driving route 102 may be an expected route based on the current direction of travel of vehicle 12. Aircraft 14 is shown in FIG. 7 as being airborne, such that aircraft 14 can communicate with vehicle 12 via either wireless communications, or alternatively, via wired communications (e.g., via line 18 shown in FIG. 2). Aircraft 14 can take any flight route including those discussed above. While airborne, aircraft 14 can communicate data to vehicle 12 and/or remote system 16 regarding a variety of conditions within driving environment 100.

For example, vehicle 12 can provide various data about traffic conditions along route 102. Aircraft 14 can also capture images, video, or other data related to an upcoming intersection, curve, bend, hill, etc. to provide enhanced viewing capabilities for a driver regarding blind intersections, cross-traffic 104, the presence of police, emergency personnel, etc. Furthermore, aircraft 14 can be configured to identify street signs 106 and provide visual, electronic, and/or audio data regarding the name of a street being travelled on and/or one or more cross-streets. Aircraft 14 can be configured to identify addresses (i.e., of an intended destination) and provide visual, electronic, and/or audio data regarding the location of the address, the characteristics of its surroundings, etc. Further yet, aircraft 14 can fly directly to/from (without following a corresponding driving route) destination 108 to, for example, deliver an audio/electronic/visual message to a recipient, to drop off/pick up a package (see, e.g., cargo items 56 shown in FIG. 5), etc.

In some embodiments, vehicle 12 can be configured to capture data relating to and/or identify various road conditions, such as an icy or wet area 112 of a road. For example, as indicated above, aircraft sensors 48 (e.g., spectral or polarized imagers) may be configured to identify ice (e.g., black/white ice on a road, etc.). Aircraft 14 can identify the potentially icy area and communicate the data to vehicle 12 and/or remote system 16. Vehicle 12 can then provide a driver with the appropriate information (e.g., an audio and/or visual indication of the icy conditions and/or their location, etc.). Further, aircraft 14 can be configured to detect a blocked, washed-out, and/or damaged area 110 along a driving route 102, such that this data can similarly be communicated back to a driver of vehicle 12. Various other types of information regarding traffic, road, and other conditions within driving environment 100 can be communicated to vehicle 12 and/or remote system 16, and in turn to a driver of vehicle 12, according to various alternative embodiments.

Figure 8:
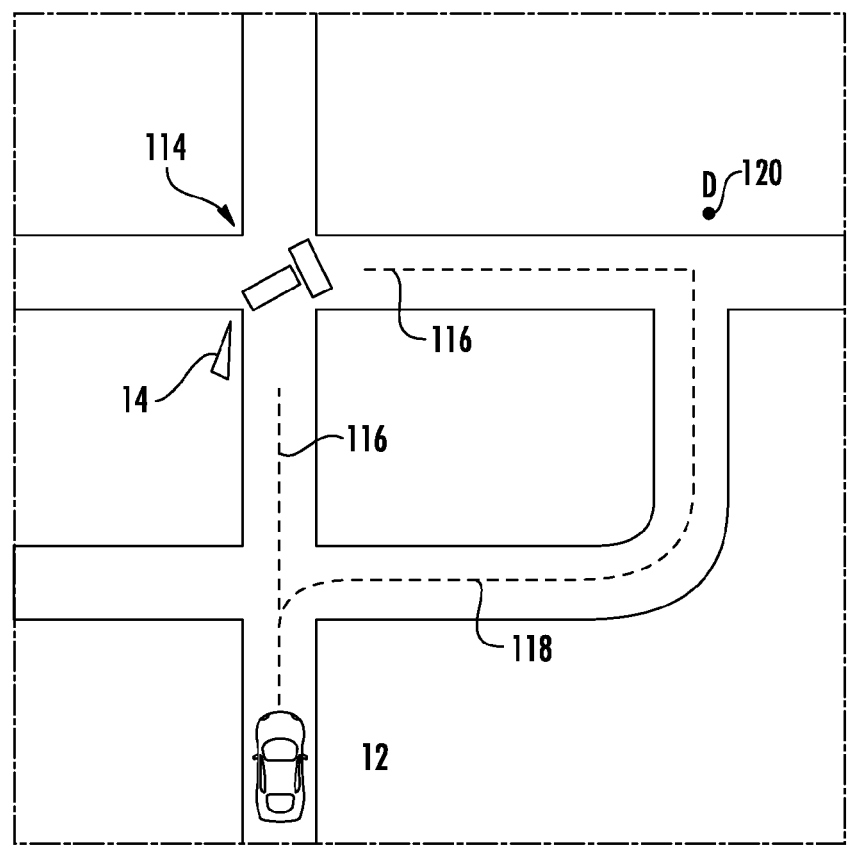
FIG. 8 is a top view of a vehicle system within a driving environment according to another embodiment.

Referring to FIG. 8, in some embodiments, aircraft 14 can be configured to analyze a primary driving route 116 and, based on various conditions, determine one or more secondary driving routes 118 that can be communicated to vehicle 12 and that may provide a faster and/or safer route for vehicle to a destination 120. For example, as shown in FIG. 8, aircraft 14 has identified a blockage 114 (e.g., a car accident or other road blockage, etc.) on primary driving route 116. Aircraft 14 can identify and analyze a secondary route 118 that also leads to destination 120, yet avoids road blockage 114. In some embodiments, aircraft 14 can be configured to communicate raw or processed road/traffic data to vehicle 12, allowing a driver or automatic control system on vehicle 12 to perform such route analysis and selections.

Figure 9:
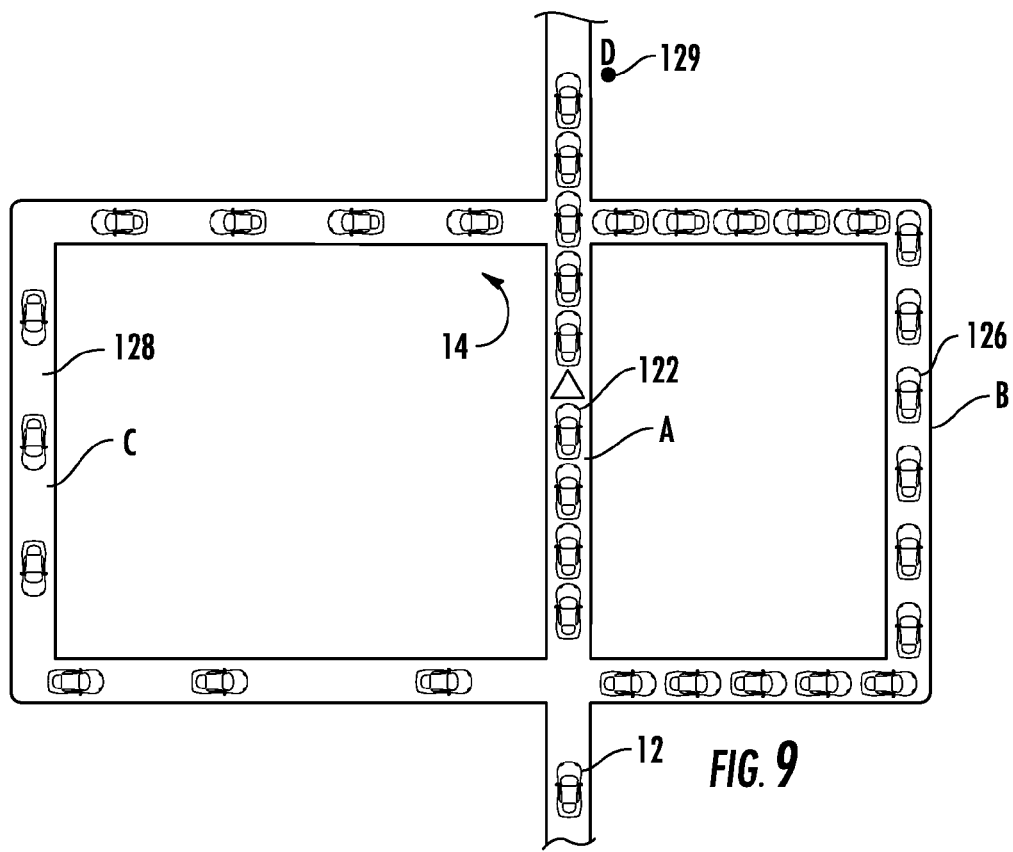
FIG. 9 is a top view of a vehicle system within a driving environment according to another embodiment.

Referring to FIG. 9, in some embodiments, aircraft 14 can be configured to identify multiple alternative or secondary routes. As shown in FIG. 9, vehicle 12 is on primary route 122 that leads to destination 124. Aircraft 14 can analyze a first alternate route 126 and a second alternate route 128 and provide a suggestion as to which route provides the shortest estimated drive time for vehicle 12 to travel from a current location to destination 124. In some embodiments, aircraft 14 can analyze alternative routes in order of which route provides the shortest driving distance (e.g., such that alternative route 126 provides a shorter driving distance to destination 124 than alternate route 128). In some embodiments, aircraft 14 can be configured to communicate raw or processed road/traffic data to vehicle 12, allowing a driver or automatic control system on vehicle 12 to perform such route analysis and selections.

Aircraft 14 can communicate back to vehicle 12 data identifying which of a number of alternative routes has the shortest driving distance, and/or which has the shortest expected travel time. It should be noted that while the alternative routes suggested in FIGS. 8 and 9 are provided based on identifying road blockages or traffic congestion, according to various alternative embodiments, alternative routes may be identified based on a variety of other conditions, including weather conditions (e.g., to avoid rain, snow), road construction (e.g., to avoid dust, dirt, traffic), and the like. All such embodiments are to be understood to be within the scope of the present disclosure.

Figure 10:
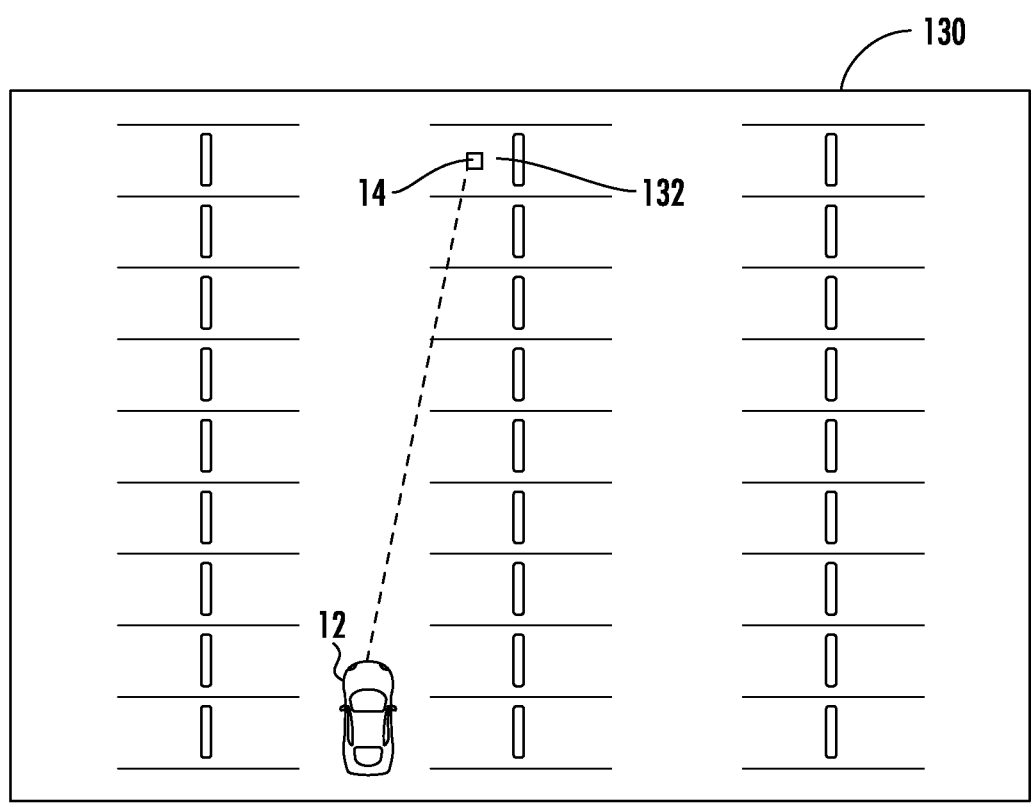
FIG. 10 is a top view of a vehicle system within a driving environment according to another embodiment.

Referring to FIG. 10, in some embodiments, aircraft 14 is configured to identify and reserve a parking space for vehicle 12 and communicate the location of the parking space back to vehicle 12. For example, vehicle 12 can survey parking lot 130 and identify one or more open parking spaces such as parking space 132. Vehicle 12 can reserve parking space 132, either by communicating with an automated parking system or by physically occupying parking space 132, and communicate the location of parking space 132 and/or provide directions to parking space 132 back to vehicle 12. In this way, aircraft 14 can facilitate parking at large events such as sporting events, music concerts, etc., and save the driver time in finding an available parking space. While FIG. 10 illustrates aircraft 14 locating an available parking space in the context of a parking lot, in other embodiments, aircraft 14 can locate parking spaces on public streets, by communicating with automated parking garages, etc.

Referring now to FIG. 11, a method 140 of operating a vehicle system such as vehicle system 10 is shown according to one embodiment. An aircraft (e.g., a captive or unmanned aircraft, etc.) is supported on a motor vehicle (e.g., on a landing surface of the vehicle exterior, etc.) (142). While the aircraft is landed, the vehicle can provide electrical energy, fuel, control signals, etc. to the aircraft (e.g., by way of an aircraft to vehicle coupling interface or port, etc.) (144). The aircraft can then take off, or launch, from the vehicle (146). In various alternative embodiments, the aircraft can take off from the vehicle both while the vehicle is stationary and while the vehicle is moving. While airborne, the aircraft can capture or acquire various information about the environment (e.g., the driving environment of the vehicle, etc.) (148). Based on the captured information, the aircraft can provide various types of aircraft output data to the vehicle (150). The information can include traffic information, road condition information, etc. Based on receiving the aircraft output data, the vehicle (e.g., by way of one or more output devices, etc.) can provide various driving data to a driver (152). The data provided to the driver can take the form of traffic alerts, alternative driving routes, still or video images of a road along a driving route, etc. Alternatively, rather than or in addition to providing data to a driver, data can be provided to a vehicle control system, which may be or include a robotic driving system configured to autonomously or semi-autonomously control vehicle 12 based at least in part on the received data. After capturing the desired data, the aircraft can return to and land on the vehicle (154). As noted above, the aircraft can be configured to land on both a stationary and moving vehicle according to various alternative embodiments.

Referring to FIG. 12, a method 160 of operating a vehicle system such as vehicle system 10 is shown according to another embodiment. An aircraft (e.g., a captive or unmanned aircraft, etc.) is supported on a motor vehicle (e.g., on a landing surface of the vehicle exterior) (162). While the aircraft is landed, the vehicle can provide electrical energy, fuel, control signals, etc. to the aircraft (e.g., by way of an aircraft to vehicle coupling interface or port) (164). The aircraft can then take off from the vehicle (166). In various alternative embodiments, the aircraft can take off from the vehicle both while the vehicle is stationary and while the vehicle is moving. While airborne, the aircraft can capture information about the environment (e.g., the driving environment of the vehicle) (168). Based on the captured information, the aircraft can provide various types of aircraft output data to a remote system (rather than or in addition to providing data to vehicle 12) (170). Based on receiving the aircraft output data, the remote system can control operation of vehicle 12 (e.g., by remotely controlling an on-board vehicle control or robotic driving system) (172, 174). After capturing the desired data, the aircraft can return to and land on the vehicle (176). As noted above, the aircraft can be configured to land on both a stationary and moving vehicle according to various alternative embodiments.

Figure 13:
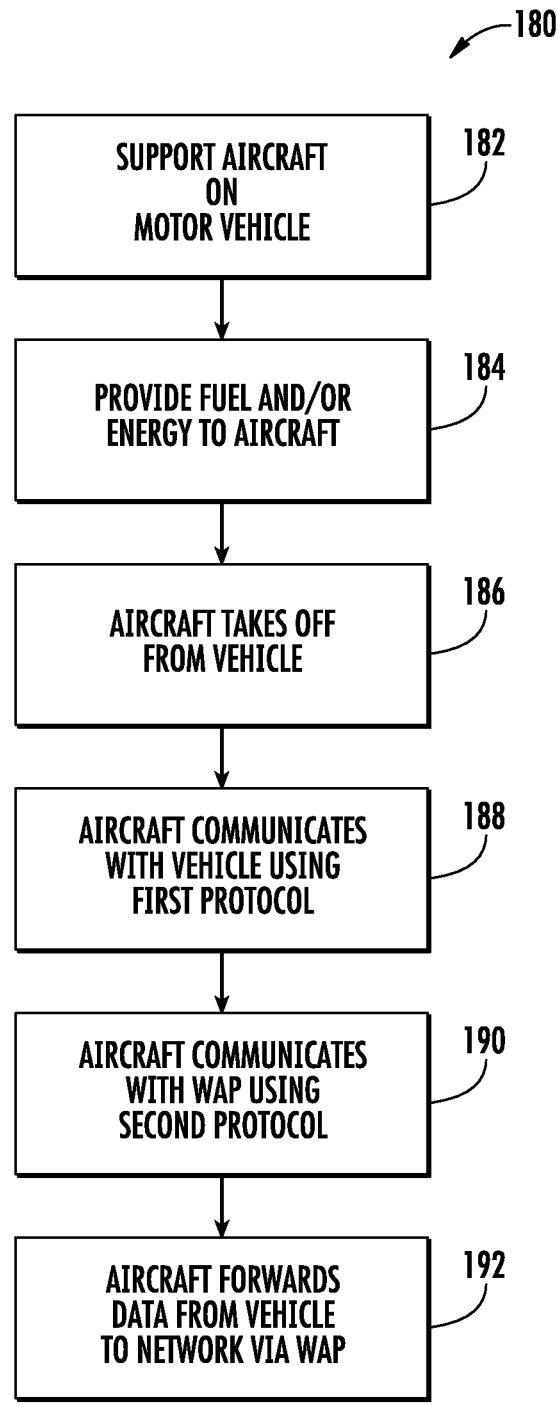
FIG. 13 is a block diagram of a method of operating a vehicle system according to another embodiment.

Referring to FIG. 13, a method 180 of operating a vehicle system such as vehicle system 10 is shown according to another embodiment. An aircraft (e.g., a captive or unmanned aircraft, etc.) is supported on a motor vehicle (e.g., on a landing surface of the vehicle exterior, etc.) (182). While the aircraft is landed, the vehicle can provide electrical energy, fuel, control signals, etc. to the aircraft (e.g., by way of an aircraft to vehicle coupling interface or port, etc.) (184). The aircraft can then take off from the vehicle (186). In various alternative embodiments, the aircraft can take off from the vehicle both while the vehicle is stationary and while the vehicle is moving. While airborne, the aircraft can communicate with the vehicle using a first communication protocol (188), and communicate with a wireless access point via a second communication protocol (190). For example, should the vehicle be out of range of a wireless access point (WAP) such as WAP 92 shown in FIG. 6, the aircraft can be deployed so as to come within range of WAP 92 while also maintaining communications with the vehicle. As such, the aircraft can relay data received from the vehicle to a network such as network 94 (see FIG. 6) via the WAP (192).

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of operating a motor vehicle system, comprising:
providing an actively propelled unmanned aircraft on an aircraft landing area of a motor vehicle;
physically coupling the aircraft to the vehicle and transferring at least one of electrical energy and fuel from the vehicle to the aircraft;
launching the aircraft from the motor vehicle such that the aircraft becomes airborne;
acquiring environment data regarding a driving environment of the motor vehicle using the aircraft;
determining, by the aircraft, a relative position of the motor vehicle with respect to the aircraft;
communicating aircraft output data from the aircraft to the vehicle, the aircraft output data being based at least in part on the environment data and the relative position of the motor vehicle;
determining a location of the motor vehicle based on the aircraft output data; and
operating the motor vehicle based at least in part on the determined location.

2. The method of claim 1, wherein coupling the aircraft to the vehicle comprises coupling the aircraft to the vehicle while the aircraft is airborne.

3. The method of claim 1, further comprising operating the motor vehicle based at least in part on the aircraft output data.

4. The method of claim 3, wherein operating the motor vehicle includes operating the motor vehicle from a remote location.

5. The method of claim 3, wherein operating the motor vehicle includes using a robotic driving system.

6. The method of claim 1, further comprising determining a flight path for the aircraft.

7. The method of claim 6, wherein the flight path is determined based on an expected route of travel for the motor vehicle.

8. The method of claim 6, wherein the flight path is determined based on a current direction of travel for the motor vehicle.

9. The method of claim 1, wherein the aircraft output data includes traffic data.

10. The method of claim 9, further comprising determining an alternate travel route for the motor vehicle based on the traffic data.

11. The method of claim 10, wherein the alternate travel route is selected from a plurality of alternate travel routes to provide a shortest expected travel time.

12. The method of claim 10, wherein the alternate travel route is selected from a plurality of alternate travel routes to provide a shortest expected driving distance.

13. The method of claim 1, wherein the aircraft output data includes road condition data.

14. The method of claim 1, further comprising displaying driving data to a driver of the motor vehicle using a display, the driving data being generated based on the aircraft output data.

15. The method of claim 1, wherein the aircraft is launched based on determining that the communication link is unavailable.

16. A method of operating a motor vehicle system, comprising:
- acquiring environment data regarding a driving environment for a vehicle using an actively propelled unmanned aircraft;
- determining, by the aircraft, a relative position of the vehicle with respect to the aircraft;
- communicating aircraft output data from the aircraft to a remote system, the aircraft output data based at least in part on the relative position of the vehicle;
- receiving driving control signals from the remote system at the vehicle such that the vehicle is controlled in response to the driving control signals; and
- determining a location of the vehicle relative to a roadway based on the aircraft output data;
- wherein the driving control signals are based on the location of the vehicle relative to the roadway.

17. The method of claim 16, further comprising transferring one of electrical energy and fuel from the vehicle to the aircraft.

18. The method of claim 16, further comprising launching the aircraft from the vehicle.

19. The method of claim 16, further comprising launching the aircraft from the vehicle while the vehicle is moving.

20. The method of claim 16, wherein acquiring data regarding the driving environment includes using a data capture device provided on the aircraft.

21. The method of claim 16, further comprising determining a flight path for the aircraft.

22. The method of claim 21, wherein the flight path is determined based on an expected route of travel for the motor vehicle.

23. The method of claim 21, wherein the flight path is determined based on a current direction of travel for the motor vehicle.

24. The method of claim 16, wherein the aircraft output data includes road condition data.

25. The method of claim 16, wherein the aircraft output data includes traffic data.

26. The method of claim 25, further comprising determining an alternate travel route for the motor vehicle based on the traffic data.

27. The method of claim 16, further comprising determining that a communication link between the vehicle and a wireless access point is unavailable;
- wherein the aircraft is launched based on determining that the communication link is unavailable.

28. A method of communicating using a captive aircraft, comprising:
- launching an actively propelled unmanned aircraft from a motor vehicle;
- establishing a first communication link between the aircraft and the motor vehicle using a first communication protocol;
- establishing a second communication link between the aircraft and a wireless access point using a second communication protocol;
- communicating data from the motor vehicle to the aircraft using the first communication protocol;
- forwarding the data received from the motor vehicle to the wireless access point using the second communication protocol;
- determining that a third communication link between the motor vehicle and the wireless access point using the second communication protocol is unavailable;
- wherein the aircraft is launched based on determining that the third communication link is unavailable.

29. The method of claim 28, wherein the first communication protocol is a wireless communication protocol.

30. The method of claim 28, wherein the second communication protocol is a wireless communication protocol.

31. The method of claim 28, wherein the second communication protocol is different from the first communication protocol.

32. The method of claim 28, wherein the first communication link is established based on determining that the third communication link is unavailable.

33. The method of claim 28, further comprising capturing environment data regarding a driving environment for the motor vehicle at the aircraft using a data capture device.

* * * * *